US012410932B2

(12) United States Patent
Longenecker (10) Patent No.: US 12,410,932 B2
(45) Date of Patent: Sep. 9, 2025

(54) AIR CONDITIONING APPLIANCE AND METHOD FOR CONTROL

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 561 days.

(21) Appl. No.: 17/853,983

(22) Filed: Jun. 30, 2022

(65) Prior Publication Data

US 2024/0003572 A1    Jan. 4, 2024

(51) Int. Cl.
*F24F 11/63*    (2018.01)
*G05B 19/042*    (2006.01)
*F24F 11/54*    (2018.01)
*F24F 110/10*    (2018.01)

(52) U.S. Cl.
CPC ............ *F24F 11/63* (2018.01); *G05B 19/042* (2013.01); *F24F 2110/10* (2018.01); *G05B 2219/2614* (2013.01)

(58) Field of Classification Search
CPC ........ F24F 11/63; F24F 2110/10; F24F 11/54; G05B 19/042; G05B 2219/2614
USPC ........................................................ 700/276
See application file for complete search history.

(56) References Cited

U.S. PATENT DOCUMENTS

| 10,837,872 | B2 | 11/2020 | Son et al. |
| 11,549,715 | B1 * | 1/2023 | Thrift .................... F24F 1/0007 |
| 2018/0031262 | A1 | 2/2018 | Atchison et al. |
| 2019/0003735 | A1 | 1/2019 | Koizumi et al. |

FOREIGN PATENT DOCUMENTS

KR    20130122088 A    11/2016

* cited by examiner

*Primary Examiner* — Michael J Brown
(74) *Attorney, Agent, or Firm* — Dority & Manning, P.A.

(57) ABSTRACT

A control system, a central air conditioner and heat pump unit, and a computer-implemented method for operating an air conditioner unit are provided. The system and method include a first controller positioned distal to the air conditioner unit, a first sensor positioned distal to the air conditioner unit, a second controller positioned at the air conditioner unit, and a second sensor positioned proximate to the air conditioner unit. The method includes transmitting, from the first sensor, a first temperature signal to the first controller; transmitting, via the first controller, a first control signal based on the first temperature signal to the second controller; operating the sealed system based on the first control signal; generating, via the second controller, a second control signal based on a second temperature signal received from the second sensor in response to a control command; and operating the sealed system based on the second control signal.

17 Claims, 7 Drawing Sheets

AIR CONDITIONING APPLIANCE AND METHOD FOR CONTROL

FIELD OF THE INVENTION

The present subject matter relates generally to air conditioning appliances, and more particularly central air-conditioning and heat pump units and methods for control.

BACKGROUND OF THE INVENTION

Air conditioner or air conditioning appliance units are conventionally used to adjust the temperature within structures such as dwellings and office buildings. In particular, user-inaccessible air-conditioning and heat pump (ACHP) units generally include physical controls substantially inaccessible for user control. User-inaccessible ACHP units include central air-conditioning and heat pump units, such as one-unit type room air conditioner units, or vertical air-conditioner or heat pump units, single-package vertical units (SPVU). User-inaccessible ACHP units having physical controls substantially inaccessible for user control may be used to adjust the temperature in, for example, a single room or group of rooms of a structure. A typical user-inaccessible ACHP may include an indoor portion and an outdoor portion. The indoor portion generally communicates (e.g., exchanges air) with the area within a building, and the outdoor portion generally communicates (e.g., exchanges air) with the area outside a building. Accordingly, the ACHP unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through the indoor portion of the air conditioner unit. One or more control boards are typically provided to direct the operation of various elements of the particular air conditioner unit.

Such user-inaccessible ACHP units are often positioned within a closet or other confined space, in contrast to other air conditioner units, such as window air conditioner units. User-inaccessible (ACHP) units generally run based on a thermostat positioned away from the user-inaccessible ACHP. An operator of a user-inaccessible ACHP may require operating the user-inaccessible ACHP to a desired target temperature while also preventing other people from approaching the thermostat or user-inaccessible ACHP to change the temperature.

During maintenance and evaluation of the user-inaccessible ACHP, a technician may require disconnecting the user-inaccessible ACHP from the external thermostat. Technicians may require a remote thermostat or simulator device to perform maintenance and evaluation tasks. However, such devices may be costly and mitigate performance of control modes and operation at the user-inaccessible ACHP when the external thermostat is unavailable.

As such, methods and systems for operating an air conditioning appliance addressing one or more of the above issues is desired.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a central air-conditioning and heat pump unit is provided. The central air-conditioning and heat pump unit includes a housing defining an outdoor portion and an indoor portion. The central air-conditioning and heat pump unit includes a sealed system including an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger. A temperature sensor is positioned at the central air conditioning and heat pump unit. A control system is positioned at the central air conditioning and heat pump unit. The control system is operably coupled to the sealed system and the temperature sensor. The control system includes a memory device and a processor, wherein the memory device is configured to store instructions that, when executed by the processor, causes the central air conditioning and heat pump unit to perform operations. The operations include receiving, via a user, a control command at the control system; generating, based on the control command, a control signal based on a temperature signal received from the temperature sensor; and operating the sealed system based on the control signal.

In another exemplary aspect of the present disclosure, a control system for a central air conditioner unit is provided. The air conditioner unit includes a housing defining an outdoor portion and an indoor portion and a sealed system including an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger. The control system includes a first controller positioned distal to the sealed system, a first sensor positioned distal to the sealed system, a second controller positioned at the sealed system, and a second sensor positioned proximate to the sealed system. The control system is configured to transmit, from the first sensor, a first temperature signal to the first controller; transmit, via the first controller, a first control signal based on the first temperature signal to the second controller; and operate the sealed system based on the first control signal. The control system is configured to generate, via the second controller, a second control signal based on a second temperature signal received from the second sensor in response to a control command; and operate the sealed system based on the second control signal.

Yet another aspect of the present disclosure is directed to a computer-implemented method for operating an air conditioner unit. The air conditioner unit includes a first controller positioned distal to the air conditioner unit, a first sensor positioned distal to the air conditioner unit, a second controller positioned at the air conditioner unit, and a second sensor positioned proximate to the air conditioner unit. The method includes transmitting, from the first sensor, a first temperature signal to the first controller; transmitting, via the first controller, a first control signal based on the first temperature signal to the second controller; operating the sealed system based on the first control signal; generating, via the second controller, a second control signal based on a second temperature signal received from the second sensor in response to a control command; and operating the sealed system based on the second control signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Figure 1:
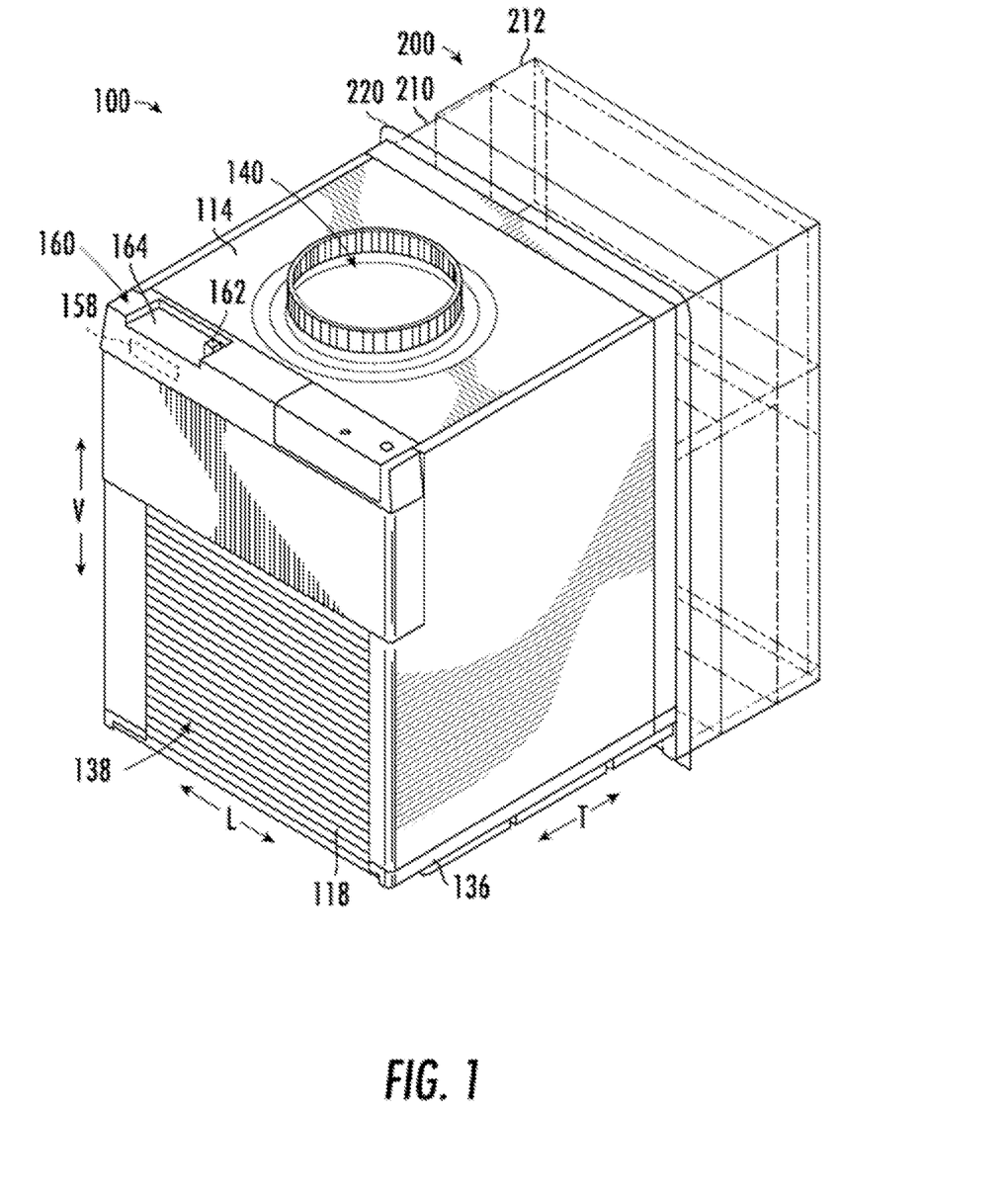
FIG. 1 provides a perspective view of an air conditioning appliance according to exemplary embodiments of the present disclosure.
Figure 2:
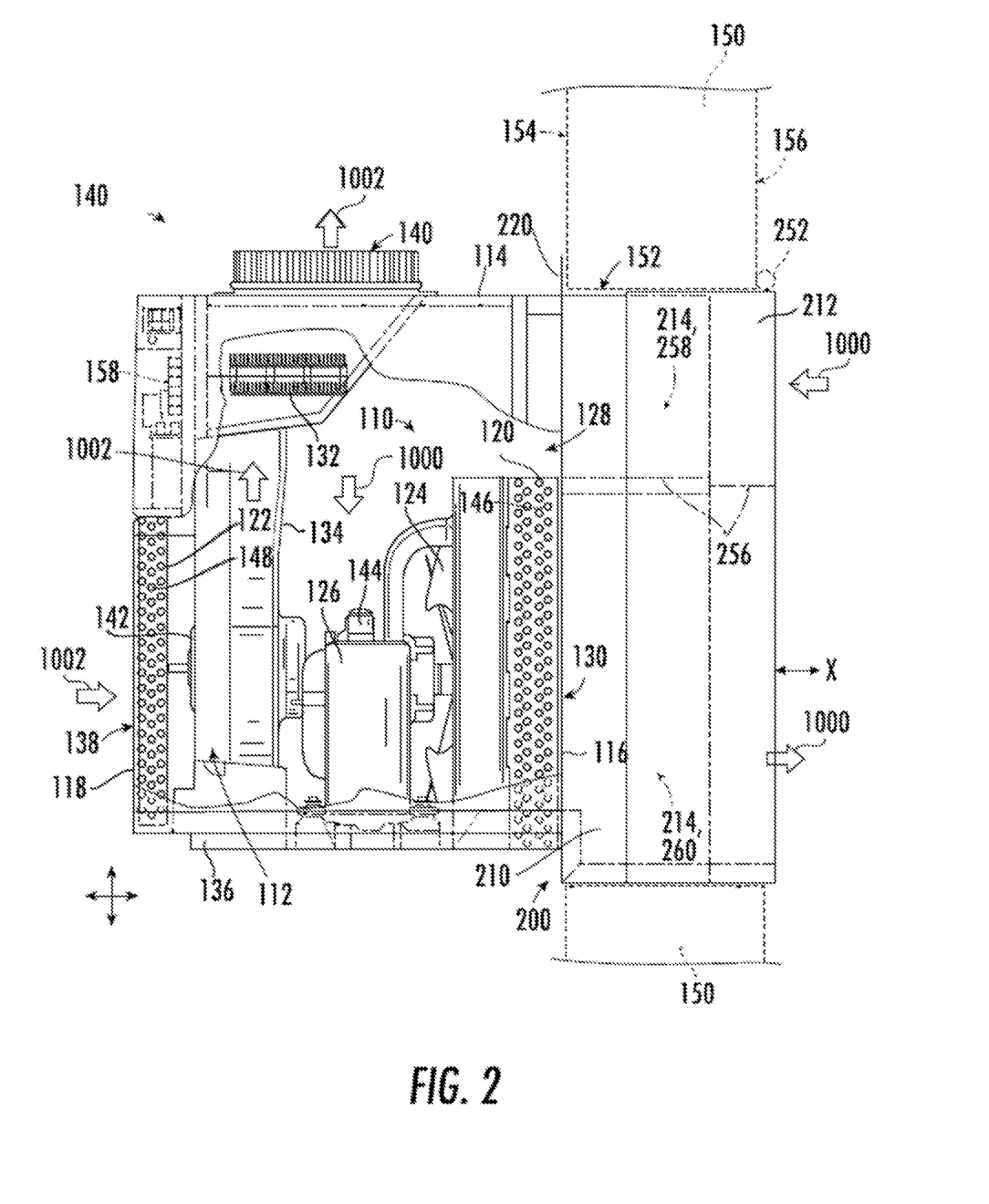
FIG. 2 provides a side view of the exemplary air conditioner unit of FIG. 1.

Turning now to the figures, FIGS. 1 and 2 illustrate an exemplary air conditioner appliance (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110.

Generally, air conditioner 100 defines a vertical direction V, lateral direction L, and transverse direction T. Each direction V, L, T is perpendicular to each other, such that an orthogonal coordinate system is generally defined.

In some embodiments, housing 114 contains various other components of the air conditioner 100. Housing 114 may include, for example, a rear opening 116 (e.g., with or without a grill or grate thereacross) and a front opening 118 (e.g., with or without a grill or grate thereacross) may be spaced apart from each other along the transverse direction T. The rear opening 116 may be part of the outdoor portion 110, while the front opening 118 is part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components of outdoor portion 110 are mounted on a basepan 136, as shown.

During certain operations, air 1000 may be drawn to outdoor portion 110 through rear opening 116. Specifically, an outdoor inlet 128 defined through housing 114 may receive outdoor air 1000 motivated by outdoor fan 124. Within housing 114, the received outdoor air 1000 may be motivated through or across outdoor fan 124. Moreover, at least a portion of the outdoor air 1000 may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable discrete orientation.

As shown, indoor portion 112 may include an indoor heat exchanger 122, a blower fan 142, and a heating unit 132. These components may, for example, be housed behind the front opening 118. A bulkhead 134 may generally support or house various other components or portions thereof of the indoor portion 112, such as the blower fan 142. Bulkhead 134 may generally separate and define the indoor portion 112 and outdoor portion 110 within housing 114. Additionally, or alternatively, bulkhead 134 or indoor heat exchanger 122 may be mounted on basepan 136 (e.g., at a higher vertical position than outdoor heat exchanger 120), as shown.

During certain operations, air 1002 may be drawn to indoor portion 112 through front opening 118. Specifically, an indoor inlet 138 defined through housing 114 may receive indoor air 1002 motivated by blower fan 142. At least a portion of the indoor air 1002 may be motivated through or across indoor heat exchanger 122 (e.g., before passing to bulkhead 134). From blower fan 142, indoor air 1002 may be motivated (e.g., across heating unit 132) and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air 1002 from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchanger 120, 122 may be components of a sealed system 125 forming a thermodynamic assembly that may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated to perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

The sealed system 125 may, for example, further include compressor 126 (e.g., mounted on basepan 136) and an expansion device (e.g., expansion valve or capillary tube—not pictured), both of which may be in fluid communication with the heat exchangers 120, 122 to flow refrigerant therethrough, as is generally understood. The outdoor and indoor heat exchanger 120, 122 may each include coils 146, 148, as illustrated, through which a refrigerant may flow for heat exchange purposes, as is generally understood.

As will be further described in detail below, a plenum 200 may be provided to direct air to or from housing 114. When installed, telescoping plenum 200 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed). In particular, plenum 200 extends along an axial direction X (e.g., parallel to the transverse direction T) through a hole or channel 152 in the structure wall 150 that passes from an internal surface 154 to an external surface 156.

The operation of air conditioner 100 including compressor 126 (and thus the sealed system generally), blower fan 142, outdoor fan 124, heating unit 132, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs, or the like, such as general or special purpose microprocessors operable to execute programming instructions or microcontrol code associated with operation of air conditioner 100. The memory may be a separate component from the processor or may be included onboard within the processor. The memory may represent random access memory such as DRAM, or read only memory such as ROM or FLASH.

Air conditioner 100 may additionally include a control panel 160 and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display 164 may additionally be provided in the control panel 160, and may be in communication with the controller 158. Display 164 may, for example be a touchscreen or other text-readable display screen, or alternatively may simply be a light that can be activated and deactivated as required to provide an indication of, for example, an event or setting for the air conditioner 100.

Figure 3:
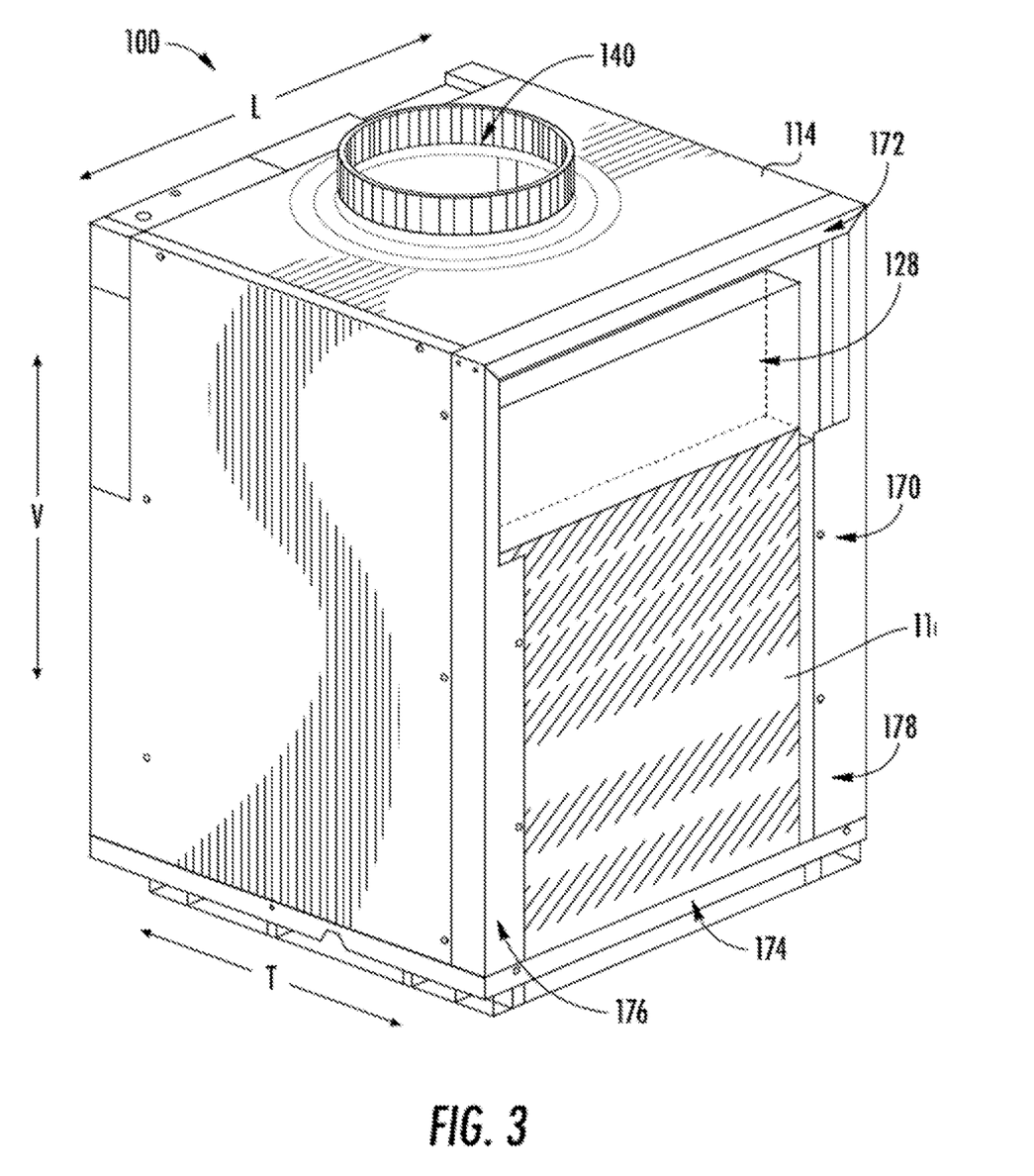
FIG. 3 provides a perspective view of a plenum of an air conditioning appliance according to exemplary embodiments of the present disclosure.

FIG. 3 provides a rear perspective view of the housing 114 of the air conditioning appliance 100 in isolation, e.g., without the plenum 200 attached. As may be seen in FIG. 3, the housing 114, in particular the outdoor portion 110 thereof, defines a first sealing surface 170. The first sealing surface 170 lies in a lateral-vertical plane, e.g., a plane defined by the vertical direction V and the lateral direction L. The lateral-vertical plane is thus perpendicular to the transverse direction T and the axial direction X. The first sealing surface 170 extends around and encloses the outdoor inlet 128 and outdoor outlet 130 on all sides. For example, as may be seen in FIG. 3, the first sealing surface 170 may include an upper segment 172 positioned above the outdoor inlet 128 and the outdoor outlet 130 along the vertical direction V, a lower segment 174 positioned below the outdoor inlet 128 and the outdoor outlet 130 along the vertical direction V, a first side 176 segment extending along the vertical direction V from the upper segment 172 to the lower segment 174, and a second side segment 178 extending along the vertical direction V from the upper segment 172 to the lower segment 174. The upper segment 172 may extend along the lateral direction L. The upper segment 172 may encompass the outdoor inlet 128 and the outdoor outlet 130 along the lateral direction, e.g., the upper segment 172 may extend over a greater lateral distance than the outdoor inlet 128 and the outdoor outlet 130 and may be positioned relative to the outdoor inlet 128 and the outdoor outlet 130 such that the outdoor inlet 128 and the outdoor outlet 130 are entirely overlapped by the upper segment 172 along the lateral direction L. The lower segment 174 may also extend along the lateral direction L and encompass the outdoor inlet 128 and the outdoor outlet 130 along the lateral direction L, where "encompass" is used in the same sense with respect to the lower segment 174 as defined above with respect to the upper segment 172. The first side segment 176 and the second side segment 178 may be positioned opposite one another along the lateral direction L such that the outdoor inlet 128 and the outdoor outlet 130 are between the first side segment 176 and the second side segment 178 along the lateral direction L.

Figure 6:
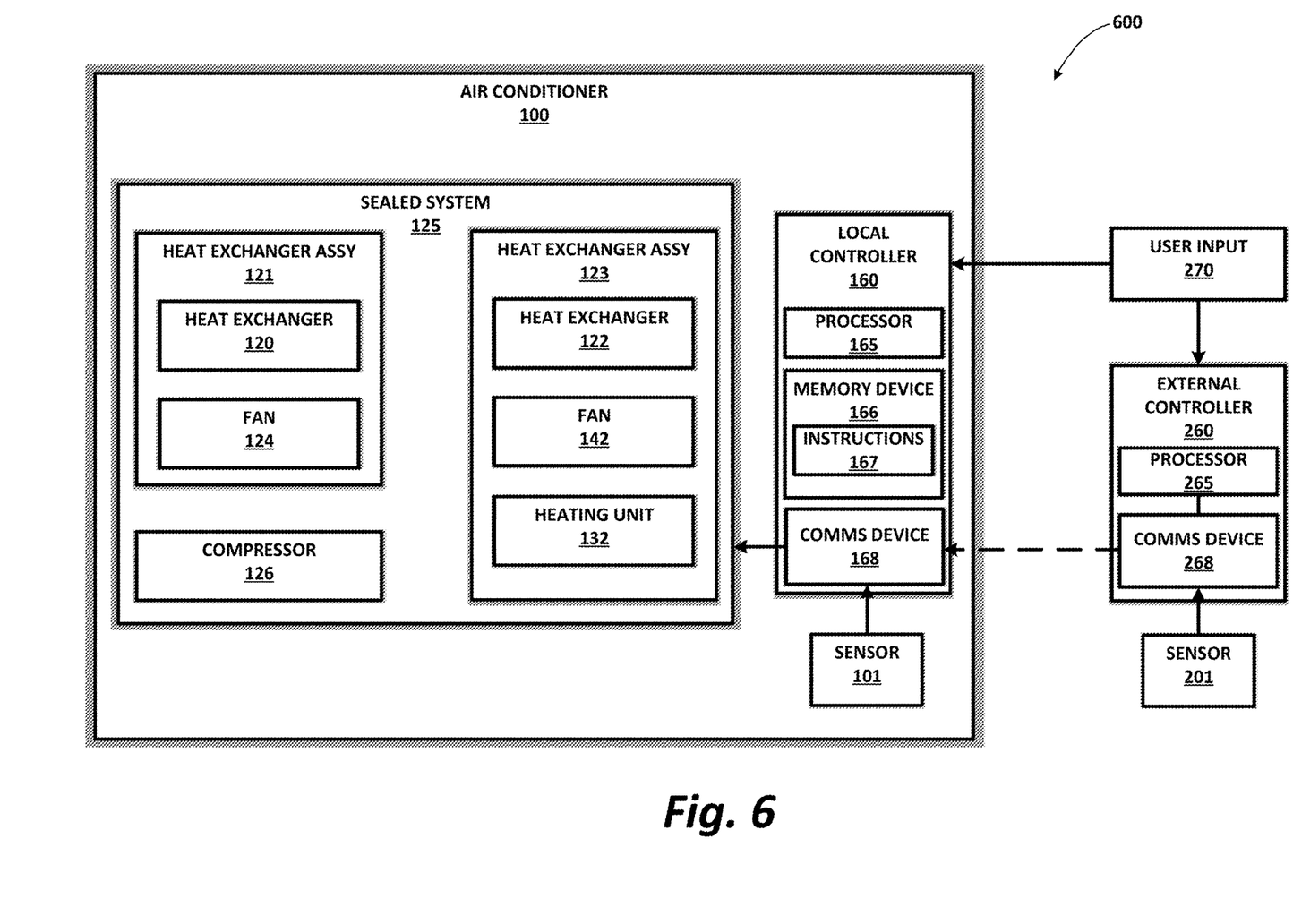
FIG. 6 provides a schematic diagram of a control system for an air conditioning appliance according to exemplary embodiments of the present disclosure.

Turning back to FIGS. 2 and 4, an exemplary plenum 200 will be described in greater detail. FIG. 6 provides a perspective view of telescoping plenum 200 in isolation and with an interior portion 210 and an exterior portion 212 separated for clarity. Advantageously, the above-described embodiments of make-up air assembly 200 may provide or permit efficient make-up airflow (e.g., without create a risk of damage to components within the housing 114).

When assembled, interior portion 210 is selectively attached to housing 114. Specifically, interior portion 210 may be mounted proximal to outdoor portion 110 or distal to indoor portion 112. In some such embodiments, interior portion 210 is fixed to or mounted against housing 114 (e.g., via one or more suitable mechanical fasteners, adhesives, gasket, etc.) about at least a portion of rear opening 116. The duct wall 216 of interior portion 210 may surround, for instance, outdoor outlet 130. Additionally, or alternatively, the duct wall 216 of interior portion 210 may surround outdoor inlet 128.

In certain embodiments, interior portion 210 further includes an outer flange 220 that extends in a radial direction (e.g., perpendicular to the axial direction X) from duct wall 216. Specifically, outer flange 220 extends radially outward (e.g., away from at least a portion of the axial direction X or the duct wall 216 of interior portion 210). Outer flange 220 may thus avoid interference an airflow or flow path within air channel 214.

Figure 4:
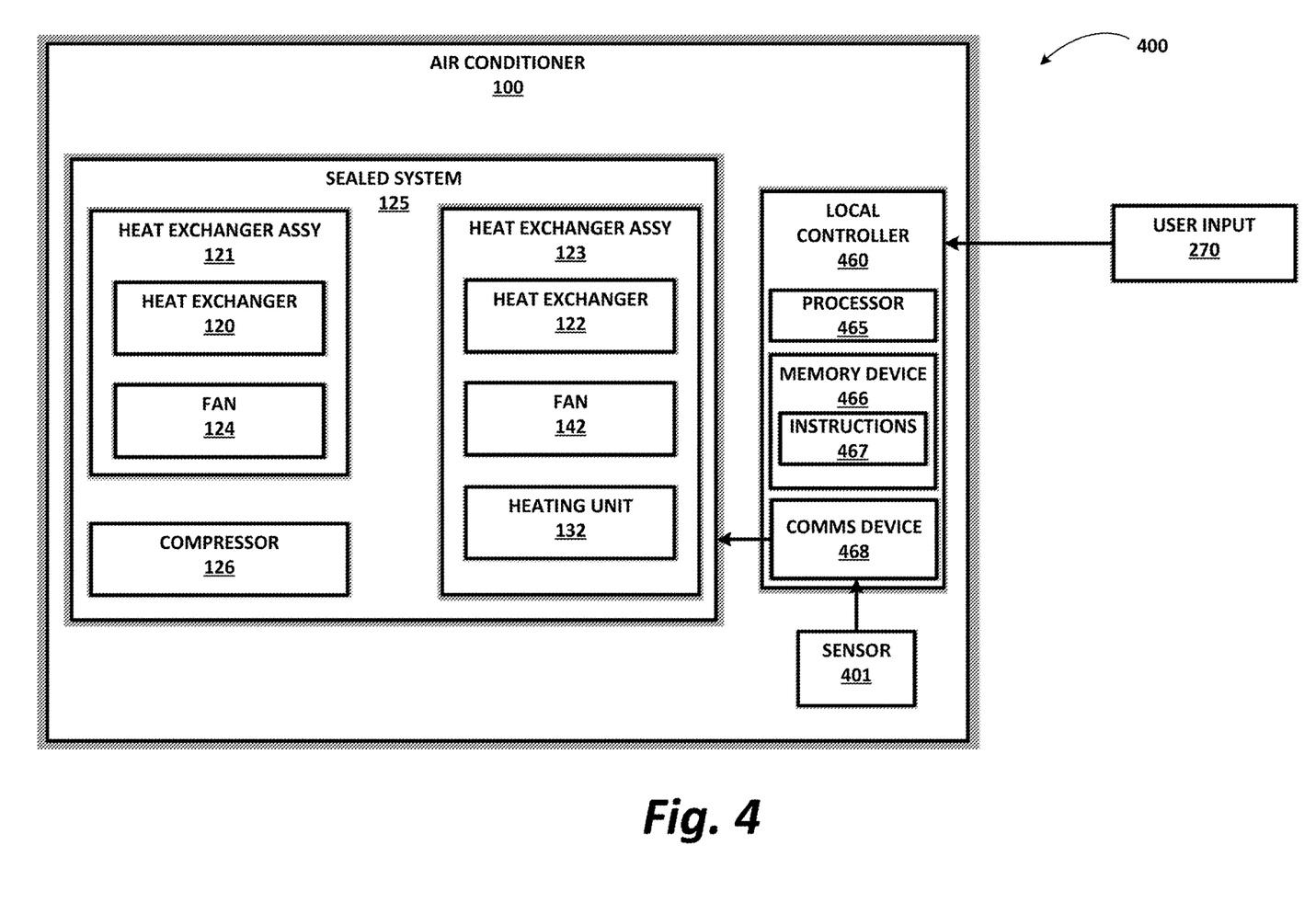
FIG. 4 provides a schematic diagram of a control system for an air conditioning appliance according to exemplary embodiments of the present disclosure.

Referring now to FIG. 4, an exemplary schematic diagram of a control system 400 for a central or user-inaccessible air-conditioning and heat pump (ACHP) unit is provided. Embodiments of the control system 400 may be included with, or configured in part with, embodiments of air conditioner 100 such as provided in FIGS. 1-3. Control system 400 includes a local controller 460 positioned at or proximate to the sealed system 125. A temperature sensor 401 is positioned proximate to the sealed system 125. Sensor 401 is positioned to receive an inlet air temperature at the air conditioner unit 100. In various embodiments, local controller 460 is positioned at housing 114, such as depicted and described in regard to FIGS. 1-3. In still various embodiments, sensor 401 is positioned at a duct, such as plenum 200, configured to provide air to or from housing 114, or particularly, sealed system 125.

Embodiments of local controller 460 may include a processor 465, a memory device 466, and a communications module 468. The memory device 466 is configured to receive and store instructions 467 that, when executed by the processor 465, causes the air conditioner unit 100 to perform operations. The communications module 468 provides a wired or wireless communications bus to send and/or receive signals, such as operational commands based on the instructions 467, to compressor 126, to heat exchanger assembly 121, 123, or particularly, one or more power actuatable devices, such as, but not limited to, fan 124, 142, heat exchanger, 120, 122, heating unit 132, an expansion device, a control surface, motors, or electric machines. The instructions 167 include one or more steps of method 1000, such as provided further herein.

Figure 5:
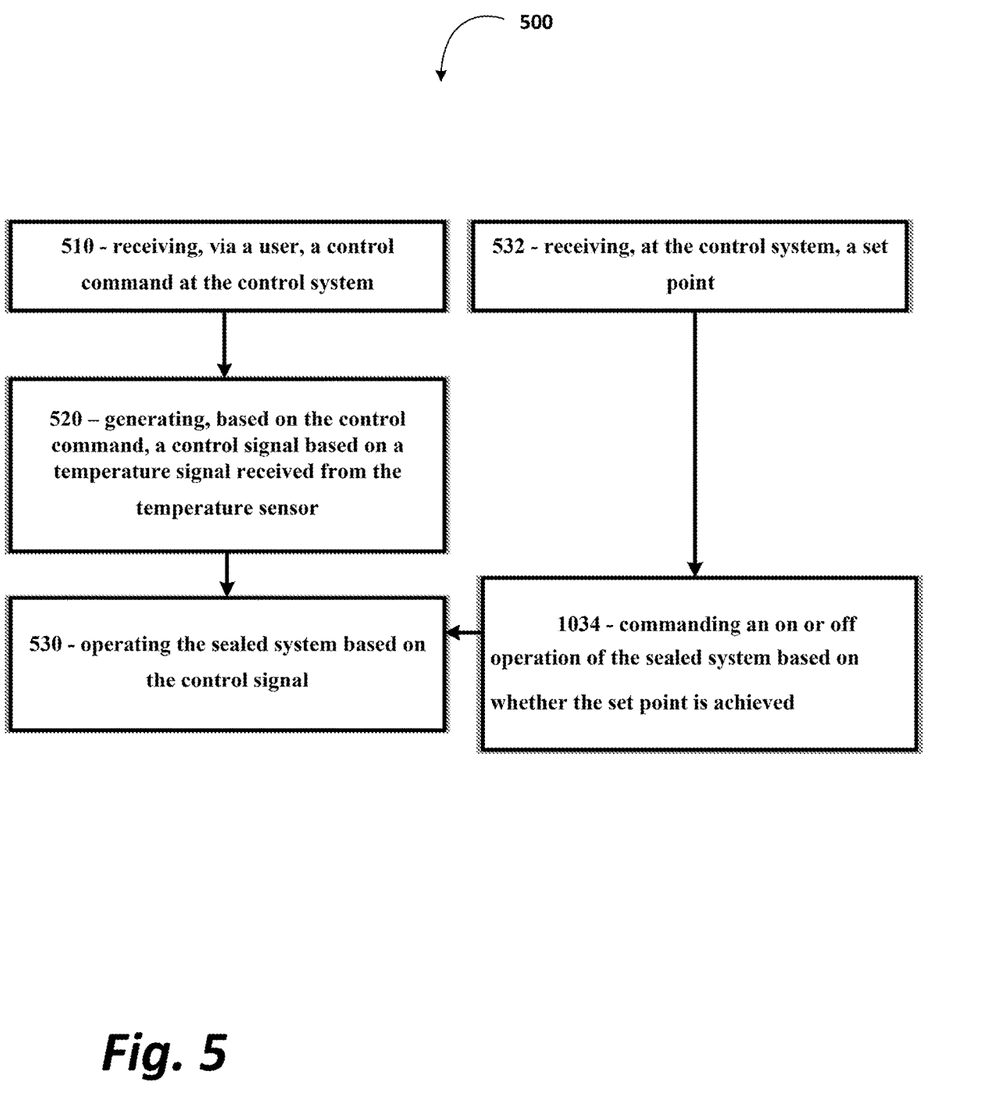
FIG. 5 provides a flowchart outlining steps of a method for operating an air conditioner in accordance with embodiments of the present disclosure.

Referring now to FIG. 5, a flowchart outlining steps of a method for operating an air conditioner unit is provided (hereinafter, "method 500"). Embodiments of method 500 may particularly be utilized for operating central ACHP units, such as single package, packaged terminal, or vertical air conditioners and heat pumps, or generally, user-inaccessible ACHP units. Steps of method 500 may be stored as instructions 467 at control system 400 (FIG. 4), that, when executed by processor 465, causes the air conditioner 100, or particularly the sealed system 125, to perform operations, such as one or more steps of method 500. It should be appreciated that method 500 and control system 400 may be performed with various embodiments of central air conditioner units, or particularly single package air conditioner units, packaged terminal air conditioner units, vertical air conditioner units, single package vertical units, or heat pump configurations, or combination air conditioner and heat pump configurations.

Referring to FIG. 5, embodiments of method 500 include at 510 receiving, via a user input (i.e., user input 270), a control command, and at 520 generating, based on the control command, a control signal based on a temperature signal received from the temperature sensor (e.g., sensor 401). Method 500 includes at 530 operating the sealed system (e.g., sealed system 125) based on the control signal. In certain embodiments, method 500 includes at 532 receiving, at the control system, a set point. In certain embodiments, method 500 at 532 includes receiving the set point via the user input 270. In still certain embodiments, method 500 includes at 534 commanding an on or off operation of the sealed system based on whether the set point is achieved. In a particular embodiment, commanding the on or off operation of the sealed system is based on whether the sensor (e.g., sensor 401) detects a threshold temperature corresponding to the set point.

Embodiments of the air conditioner 100, control system 400, and method 500 provided herein allow for operating a central air-conditioning and heat pump unit, such as single package, packaged terminal, or vertical air conditioners and heat pumps, or generally, user-inaccessible ACHP units, via a local controller, such as during development, service, and installation. Embodiments such as provided herein may allow for evaluation of the ACHP unit without requiring signals from an external thermostat or controller.

Referring now to FIG. 6, an exemplary schematic diagram of a control system 600 for a central or user-inaccessible air-conditioning and heat pump (ACHP) unit is provided. Embodiments of the control system 600 may be included with, or configured in part with, embodiments of air conditioner 100 such as provided in FIGS. 1-3. Control system 600 includes a first controller, such as external controller 260, positioned distal to the sealed system 125. A first sensor 201, such as a temperature sensor, is positioned distal to the sealed system 125. First sensor 201 is positioned to receive a room temperature and first controller 260 is positioned at a room at which the room temperature is received. In various embodiments, one or both of first sensor 201 and first controller 260 is positioned at a wall or other mount surface in the room at which the room temperature is taken. Control system 600 includes a second controller, such as a local controller 160, positioned proximate to the sealed system 125. A second sensor 101, such as a temperature sensor, is positioned proximate to the sealed system 125. Second sensor 101 is positioned to receive an inlet air temperature at the air conditioner unit 100. In various embodiments, second controller 160 is positioned at housing 114, such as depicted and described in regard to FIGS. 1-3. In still various embodiments, second sensor 101 is positioned at a duct, such as plenum 200, configured to provide air to or from housing 114, or particularly, sealed system 125.

Embodiments of second controller 160 may include a processor 165, a memory device 166, and a communications module 168. The memory device 166 is configured to receive and store instructions 167 that, when executed by the processor 165, causes the air conditioner unit 100 to perform operations. The communications module 168 provides a wired or wireless communications bus to send and/or receive signals, such as operational commands based on the instructions 167, to compressor 126, to heat exchanger assembly 121, 123, or particularly, one or more power actuatable devices, such as, but not limited to, fan 124, 142, heat exchanger, 120, 122, heating unit 132, an expansion device, a control surface, motors, or electric machines. The instructions 167 include one or more steps of method 1000, such as provided further herein.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device may generally include memory element(s) including, but not limited to, computer readable medium (e.g., random access memory (RAM)), computer readable non-volatile medium (e.g., flash memory), or other suitable memory elements or combinations thereof.

In general, communication from first controller 260 and air conditioner unit 100 may be carried using any type of wired or wireless connection and using any suitable type of communication network, non-limiting examples of which are provided below. For example, first controller 260 may be in direct or indirect communication with air conditioner unit 100 through any suitable wired or wireless communication connections, interfaces, or networks. For example, networks may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL). Particular portions of first controller 260, such as the communications module 268, may be in operable communication with particular portions of second controller 160, such as communication module 168, such as to provide control signals from first controller 260 to second controller 160. First controller 260 may accordingly transmit control signals (i.e., first control signals) to second controller 160, and second controller 160 may operate the sealed system 125 based on control signals received from first controller 160. Still further, second controller 160 is configured to generate and transmit control signals (i.e., second control signals) to operate the sealed system 125, such as described further herein.

Figure 7:
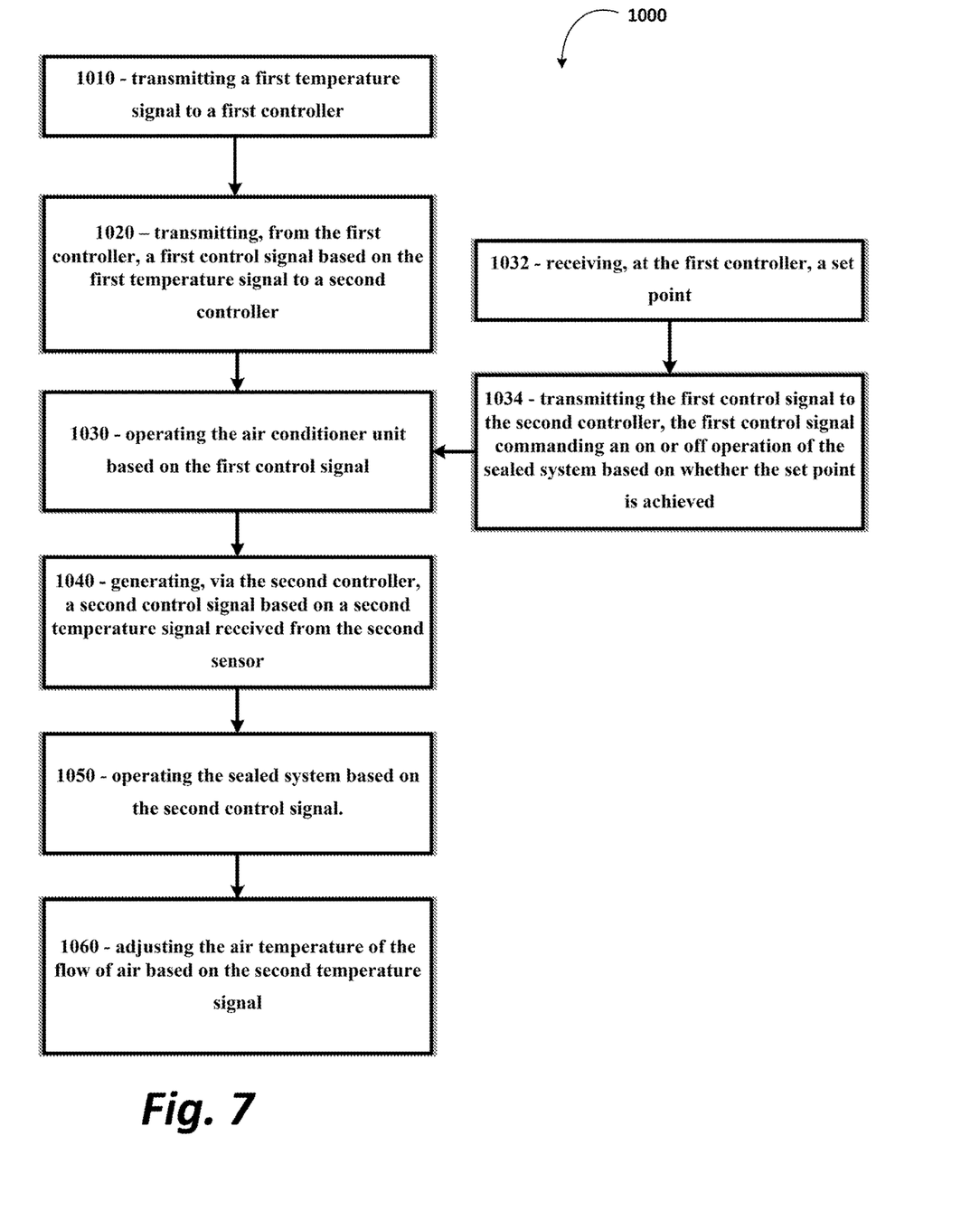
FIG. 7 provides a flowchart outlining steps of a method for operating an air conditioner in accordance with embodiments of the present disclosure.

Referring now to FIG. 7, a flowchart outlining steps of a method for operating an air conditioner unit is provided (hereinafter, "method 1000"). Embodiments of method 1000 may particularly be utilized for operating central ACHP units, such as single package, packaged terminal, or vertical air conditioners and heat pumps, or generally, user-inaccessible ACHP units. Steps of method 1000 may be stored as instructions 167 at control system 600 (FIG. 6), that, when executed by processor 165, causes the air conditioner 100, or particularly the sealed system 125, to perform operations, such as one or more steps of method 1000. It should be appreciated that method 1000 and control system 600 may be performed with various embodiments of air conditioner units, or particularly single package air conditioner units, packaged terminal air conditioner units, vertical air conditioner units, single package vertical units, or heat pump configurations, or combination air conditioner and heat pump configurations.

Embodiments of method 1000 and control system 600 are configured to operate an air conditioner unit (e.g., air conditioner unit 100) in a first control mode based on a first control signal generated and transmitted by a first controller (e.g., the external controller 260) in the room being cooled or heated, furthermore configured to operate in a second control mode based on a second control signal generated and transmitted by a second controller (e.g., local controller 160) in a closet, confined space, or other space at which the air conditioner unit is stored. The first control signal may generally be a binary signal, such as an "on" or "off" signal, based on whether a set point received at the first controller is achieved. Accordingly, the set point may form a temperature threshold outside of which (or outside of a predetermined range or tolerance) the first controller transmits the first control signal as an "on" signal to operate the sealed system to generate heated or cooled air for the room. At the set point (or within a predetermined range or tolerance), the first controller transmits the first control signal as an "off" signal to discontinue operation of the sealed system. A first temperature signal received from the first sensor 201 may correspond to an ambient, environment, or room temperature of the room (e.g., corresponding to a location of the external controller 260). Accordingly, the first controller, such as a processor 265 of external controller 260, may be configured to compare a set point received by a user (i.e., user input 270) to a first temperature signal received from first sensor 201 to determine whether to generate and transmit the first control signal as an "on" or "off" signal to the air conditioner unit.

The second controller is configured to generate and transmit a second control signal to the air conditioner unit, or particularly the sealed system 125, to operate the air conditioner, or particularly the sealed system, based on a second temperature signal from second sensor 101. In particular embodiments, second temperature signal corresponds to an inlet air temperature at the air conditioner unit. In still particular embodiments, second temperature signal corresponds to inlet air temperature received at the air conditioner unit, or particularly the sealed system. Such an embodiment may contrast with the first temperature signal corresponding to a room temperature in the room at which the external controller 260 is positioned. Accordingly, quantities and magnitudes corresponding to the first temperature signal and second temperature signal may differ based at least on differences between the room at which conditioned air is provided versus air as received into the air conditioner unit.

Still further, local controller 160 and second sensor 101 may particularly be configured to provide closed-loop control of the air conditioner unit 100 or sealed system 125. In certain embodiments, method 1000 and control system 600 are configured to operate the sealed system 125 based on an operating mode corresponding to a set point error range corresponding to the second control signal. In various embodiments, instructions 167 stored at memory device 166 include one or more operating modes each based on respective set point error ranges.

In a cooling mode, set point error may include a difference between inlet temperature (i.e., corresponding to second temperature signal) and a set point received from a user (i.e., user input 270). In a heating mode, set point error may include a difference between a set point and inlet temperature. A first operating mode may correspond to a first heating or cooling output below a first temperature threshold. A second operating mode may correspond to a second heating or cooling output within a first temperature range. A third operating mode may correspond to a third heating or cooling output within a second temperature range. An Nth operating mode may correspond to an Nth heating or cooling output greater than a second temperature threshold. Accordingly, an air temperature of the flow of air to the room may be adjusted, changed, or modulated based on the second temperature signal.

Referring to FIG. 7, embodiments of method 1000 include at 1010 transmitting, from a first sensor (e.g., sensor 201), a first temperature signal to a first controller (e.g., external controller 260) and at 1020 transmitting, via the first controller (e.g., external controller 260), a first control signal based on the first temperature signal to a second controller (e.g., local controller 160). Method 1000 includes at 1030 operating the sealed system (e.g., sealed system 125) based on the first control signal. Method 1000 includes at 1040 generating, via the second controller, a second control signal based on a second temperature signal received from the second sensor in response to a control command (e.g., user input 270). Method 1000 includes at 1050 operating the sealed system based on the second control signal.

In certain embodiments, first controller (i.e., external controller 260) is a primary or master controller in which first control signals command operation of the air conditioner unit and the air conditioner unit executes operation based on the first control signal. Furthermore, second controller is a secondary controller in which second control signals may not effectuate operation of the air conditioner unit when first control signals are available. Additionally, or alternatively, second controller is a secondary controller in which second control signals may be generated and transmitted when the first control signal indicating "on" operation of the air conditioner unit has been received at the second controller. Control commands from a user may change or switch the second controller (i.e., local controller 160) is a primary or master controller in which second control signals command operation of the air conditioner unit and the air conditioner unit executes operation based on the second control signal.

The control command may particularly include a user input that switches off or on the first controller. The control command may additionally, or alternatively, switch the primary controller between the external controller 260 and the local controller 160. In an exemplary embodiment of operation, external controller 260, such as a thermostat or other temperature control device in the room, may be turned off by a technician when performing maintenance at the air conditioner unit. Air conditioner unit controls may then be effectuated by the local controller 160. In another exemplary embodiment of operation, external controller 260 is damaged, and further operation of the air conditioner unit is controlled by the local controller 160.

In certain embodiments, method 1000 includes at 1032 receiving, at the first controller, a set point, and at 1034 transmitting the first control signal to the second controller, the first control signal commanding an on or off operation of the sealed system based on whether the set point is achieved.

In a particular embodiment, method 1000 includes at 1060 adjusting the air temperature of the flow of air based on the second temperature signal. In a still particular embodiment, the method 1000 and control system 600 are configured to operate the air conditioner unit, or particularly the sealed system, based on an operating mode corresponding to a set point error range corresponding to the second control signal.

Embodiments of the method 1000, control system 600, and air conditioner unit 100 provided herein may facilitate for maintenance, evaluation, and control of central ACHP, single package, vertical, or packaged terminal air conditioner and heat pump systems. Particular embodiments provided herein facilitate maintenance, evaluation, and control for systems unattached to wall-mounted thermostats. A local control mode at which the local controller is the primary controller provides air conditioner unit control for evaluating operating modes or providing control without requiring a remote thermostat or simulator device. Embodiments provided herein may allow for easier maintenance and facilitate unit installation.

Further aspects and embodiments of the present disclosure are provided in the following clauses:

1. A central air conditioning and heat pump unit, the central air conditioning unit including a housing defining an outdoor portion and an indoor portion; a sealed system including an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger; a temperature sensor positioned at the central air conditioning and heat pump unit; a control system positioned at the central air conditioning and heat pump unit, wherein the control system is operably coupled to the sealed system and the temperature sensor, the control system including a memory device and a processor, wherein the memory device is configured to store instructions that, when executed by the processor, causes the central air conditioning and heat pump unit to perform operations, the operations including receiving, via a user, a control command at the control system; generating, based on the control command, a control signal based on a temperature signal received from the temperature sensor; and operating the sealed system based on the control signal.

2. The central air conditioning and heat pump unit of any one or more clauses herein, wherein the temperature sensor is positioned to receive an inlet air temperature at the central air conditioning and heat pump unit, the temperature signal corresponding to the inlet air temperature.

3. The central air conditioning and heat pump unit of any one or more clauses herein, wherein operating the sealed system based on the control signal includes receiving, at the control system, a set point; and commanding an on or off operation of the sealed system based on whether the set point is achieved.

4. The central air conditioning and heat pump unit of any one or more clauses herein, wherein operating the sealed system based on the control signal includes operating the sealed system based on an operating mode corresponding to a set point error range.

5. A control system for a central air conditioner unit, the air conditioner unit including a housing defining an outdoor portion and an indoor portion and a sealed system including an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger, the control system including a first controller positioned distal to the sealed system; a first sensor positioned distal to the sealed system; a second controller positioned at the sealed system; a second sensor positioned proximate to the sealed system; the control system configured to: transmit, from the first sensor, a first temperature signal to the first controller; transmit, via the first controller, a first control signal based on the first temperature signal to the second controller; operate the sealed system based on the first control signal; in response to a control command, generate, via the second controller, a second control signal based on a second temperature signal received from the second sensor; and operate the sealed system based on the second control signal.

6. The control system of any one or more clauses herein, wherein the first sensor is positioned to receive a room temperature, the first temperature signal corresponding to the room temperature, and wherein the second sensor is positioned to receive an inlet air temperature at the central air conditioner unit, the second temperature signal corresponding to the inlet air temperature.

7. The control system of any one or more clauses herein, wherein the first control signal is an on-off signal.

8. The control system of any one or more clauses herein, wherein operating the sealed system based on the first control signal includes receiving, at the first controller, a set point; and transmitting the first control signal to the second controller, the first control signal commanding an on or off operation of the sealed system based on whether the set point is achieved.

9. The control system of any one or more clauses herein, the control system configured to adjust the air temperature of the flow of air based on the second temperature signal.

10. The control system of any one or more clauses herein, the control system configured to operate the sealed system based on an operating mode corresponding to a set point error range corresponding to the second control signal.

11. The control system of any one or more clauses herein, wherein the control command is a user input corresponding to operating the sealed system based on the first control signal or the second control signal.

12. The control system of any one or more clauses herein, wherein the first sensor and the second sensor are each temperature sensors.

13. The control system of any one or more clauses herein, wherein the first sensor is positioned to receive a room temperature, the first temperature signal corresponding to the room temperature, the first controller positioned at a room at which the room temperature is received.

14. The control system of any one or more clauses herein, wherein the second sensor is positioned to receive an inlet air temperature at the central air conditioner unit, the second temperature signal corresponding to the inlet air temperature, the second controller positioned at the housing of the central air conditioner unit.

15. A computer-implemented method for operating an air conditioner unit, the air conditioner unit including a first controller positioned distal to the air conditioner unit, a first sensor positioned distal to the air conditioner unit, a second controller positioned at the air conditioner unit, and a second sensor positioned proximate to the air conditioner unit, the method including transmitting, from the first sensor, a first temperature signal to the first controller, wherein the first sensor is positioned to receive a room temperature, the first temperature signal corresponding to the room temperature; transmitting, via the first controller, a first control signal based on the first temperature signal to the second controller; operating the sealed system based on the first control signal; generating, via the second controller, a second control signal based on a second temperature signal received from the second sensor in response to a control command, wherein the second sensor is positioned to receive an inlet air temperature at the air conditioner unit, the second temperature signal corresponding to the inlet air temperature; and operating the sealed system based on the second control signal.

16. The computer-implemented method of any one or more clauses herein, wherein the first control signal is an on-off signal.

17. The computer-implemented method of any one or more clauses herein, wherein operating the sealed system based on the first control signal includes receiving, at the first controller, a set point; and transmitting the first control signal to the second controller, the first control signal commanding an on or off operation of the sealed system based on whether the set point is achieved.

18. The computer-implemented method of any one or more clauses herein, the method including adjusting the air temperature of the flow of air based on the second temperature signal, wherein operating the sealed system based on the second control signal includes operating the sealed system based on an operating mode corresponding to a set point error range corresponding to the second control signal.

19. The computer-implemented method of any one or more clauses herein, wherein the control command is a user input corresponding to operating the sealed system based on the first control signal or the second control signal.

20. The computer-implemented method of any one or more clauses herein, wherein the first sensor is positioned to receive a room temperature, the first temperature signal corresponding to the room temperature, the first controller positioned at a room at which the room temperature is received, and wherein the second sensor is positioned to receive an inlet air temperature at the air conditioner unit, the second temperature signal corresponding to the inlet air temperature, the second controller positioned at the housing of the air conditioner unit.

21. A central air-conditioning and heat pump unit configured to execute the computer-implemented method of any one or more clauses herein, 22. A central air-conditioning and heat pump unit including the control system of any one or more clauses herein.

23. A central air-conditioning and heat pump unit including a control system, the control system configured to execute the computer-implemented method of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A central air conditioning and heat pump unit, the central air conditioning and heat pump unit comprising:
   a housing defining an outdoor portion and an indoor portion;
   a sealed system comprising an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger;
a temperature sensor positioned at the central air conditioning and heat pump unit, wherein the temperature sensor is positioned to receive an inlet air temperature at the central air conditioning and heat pump unit, the temperature signal corresponding to the inlet air temperature;
a control system positioned at the central air conditioning and heat pump unit, wherein the control system is operably coupled to the sealed system and the temperature sensor, the control system comprising a memory device and a processor, wherein the memory device is configured to store instructions that, when executed by the processor, causes the central air conditioning and heat pump unit to perform operations, the operations comprising:
receiving, via a user, a control command at the control system;
generating, based on the control command, a control signal based on a temperature signal received from the temperature sensor; and
operating the sealed system based on the control signal, wherein operating the sealed system based on the control signal comprises:
receiving, at the control system, a set point; and
commanding an on or off operation of the sealed system based on whether the set point is achieved.

2. The central air conditioning and heat pump unit of claim 1, wherein operating the sealed system based on the control signal comprises operating the sealed system based on an operating mode corresponding to a set point error range.

3. A control system for a central air conditioner unit, the central air conditioner unit comprising a housing defining an outdoor portion and an indoor portion and a sealed system comprising an outdoor heat exchanger assembly disposed in the outdoor portion, an indoor heat exchanger assembly disposed in the indoor portion, and a compressor in fluid communication with the outdoor heat exchanger and the indoor heat exchanger to circulate a refrigerant between the outdoor heat exchanger and the indoor heat exchanger, the control system comprising:
a first controller positioned distal to the sealed system;
a first sensor positioned distal to the sealed system, wherein the first sensor is positioned to receive a room temperature;
a second controller positioned at the sealed system;
a second sensor positioned proximate to the sealed system, wherein the second sensor is positioned to receive an inlet air temperature at the central air conditioner unit;
the control system configured to:
transmit, from the first sensor, a first temperature signal to the first controller, wherein the first temperature signal corresponds to the room temperature;
transmit, via the first controller, a first control signal based on the first temperature signal to the second controller;
operate the sealed system based on the first control signal;
in response to a control command, generate, via the second controller, a second control signal based on a second temperature signal received from the second sensor, wherein the second temperature signal corresponds to the inlet air temperature; and
operate the sealed system based on the second control signal.

4. The control system of claim 3, wherein the first control signal is an on-off signal.

5. The control system of claim 3, wherein operating the sealed system based on the first control signal comprises:
receiving, at the first controller, a set point; and
transmitting the first control signal to the second controller, the first control signal commanding an on or off operation of the sealed system based on whether the set point is achieved.

6. The control system of claim 3, the control system configured to:
adjust the air temperature of the flow of air based on the second temperature signal.

7. The control system of claim 6, the control system configured to operate the sealed system based on an operating mode corresponding to a set point error range corresponding to the second control signal.

8. The control system of claim 3, wherein the control command is a user input corresponding to operating the sealed system based on the first control signal or the second control signal.

9. The control system of claim 3, wherein the first sensor and the second sensor are each temperature sensors.

10. The control system of claim 3, wherein the first sensor is positioned to receive a room temperature, the first temperature signal corresponding to the room temperature, the first controller positioned at a room at which the room temperature is received.

11. The control system of claim 10, wherein the second sensor is positioned to receive an inlet air temperature at the central air conditioner unit, the second temperature signal corresponding to the inlet air temperature, the second controller positioned at the housing of the central air conditioner unit.

12. A computer-implemented method for operating an air conditioner unit, the air conditioner unit including a sealed system, the air conditioner unit including a first controller positioned distal to the air conditioner unit, a first sensor positioned distal to the air conditioner unit, a second controller positioned at the air conditioner unit, and a second sensor positioned proximate to the air conditioner unit, the method comprising:
transmitting, from the first sensor, a first temperature signal to the first controller, wherein the first sensor is positioned to receive a room temperature, the first temperature signal corresponding to the room temperature;
transmitting, via the first controller, a first control signal based on the first temperature signal to the second controller;
operating the sealed system based on the first control signal;
generating, via the second controller, a second control signal based on a second temperature signal received from the second sensor in response to a control command, wherein the second sensor is positioned to receive an inlet air temperature at the air conditioner unit, the second temperature signal corresponding to the inlet air temperature; and
operating the sealed system based on the second control signal.

13. The computer-implemented method of claim 12, wherein the first control signal is an on-off signal.

14. The computer-implemented method of claim 12, wherein operating the sealed system based on the first control signal comprises:
- receiving, at the first controller, a set point; and
- transmitting the first control signal to the second controller, the first control signal commanding an on or off operation of the sealed system based on whether the set point is achieved.

15. The computer-implemented method of claim 12, the method comprising:
- adjusting the air temperature of the flow of air based on the second temperature signal, wherein operating the sealed system based on the second control signal comprises operating the sealed system based on an operating mode corresponding to a set point error range corresponding to the second control signal.

16. The computer-implemented method of claim 12, wherein the control command is a user input corresponding to operating the sealed system based on the first control signal or the second control signal.

17. The computer-implemented method of claim 12, wherein the first sensor is positioned to receive a room temperature, the first temperature signal corresponding to the room temperature, the first controller positioned at a room at which the room temperature is received, and wherein the second sensor is positioned to receive an inlet air temperature at the air conditioner unit, the second temperature signal corresponding to the inlet air temperature, the second controller positioned at the housing of the air conditioner unit.

\* \* \* \* \*